(12) United States Patent
Sanders et al.

(10) Patent No.: US 9,196,997 B2
(45) Date of Patent: Nov. 24, 2015

(54) SHUTTERED LC ADAPTER

(75) Inventors: Joseph E. Sanders, Joliet, IL (US);
Gregory L. Kuffel, Plainfield, IL (US);
Phillip J. Irwin, Mokena, IL (US);
Samuel M. Marrs, Bradley, IL (US)

(73) Assignee: Panduit Corp., Tinley Park, IL (US)

( * ) Notice: Subject to any disclaimer, the term of this patent is extended or adjusted under 35 U.S.C. 154(b) by 490 days.

(21) Appl. No.: 13/293,591

(22) Filed: Nov. 10, 2011

(65) Prior Publication Data
US 2013/0121643 A1    May 16, 2013

(51) Int. Cl.
*G02B 6/38* (2006.01)
*H01R 13/453* (2006.01)
*G02B 6/40* (2006.01)

(52) U.S. Cl.
CPC .......... *H01R 13/4536* (2013.01); *G02B 6/3825* (2013.01); *G02B 6/3849* (2013.01); *G02B 6/406* (2013.01)

(58) Field of Classification Search
None
See application file for complete search history.

(56) References Cited

U.S. PATENT DOCUMENTS

| | | | |
|---|---|---|---|
| 5,363,460 A | 11/1994 | Marazzi et al. | |
| 5,716,224 A | 2/1998 | Masuda et al. | |
| 5,883,995 A | 3/1999 | Lu | |
| 5,909,526 A | 6/1999 | Roth et al. | |
| 6,004,043 A * | 12/1999 | Abendschein et al. | 385/76 |
| 6,039,585 A | 3/2000 | Kim et al. | |
| 6,206,577 B1 | 3/2001 | Hall, III et al. | |
| 6,247,849 B1 | 6/2001 | Liu | |
| 6,296,398 B1 | 10/2001 | Lu | |
| 6,302,592 B1 | 10/2001 | Zullig | |
| 6,425,694 B1 * | 7/2002 | Szilagyi et al. | 385/76 |
| 6,461,054 B1 | 10/2002 | Iwase | |
| 6,471,412 B1 | 10/2002 | Belenkiy et al. | |
| 6,524,014 B2 | 2/2003 | Stephenson et al. | |
| 6,595,696 B1 | 7/2003 | Zellak | |
| 6,685,362 B2 * | 2/2004 | Burkholder et al. | 385/78 |
| 6,688,780 B2 | 2/2004 | Duran | |
| 6,715,930 B2 * | 4/2004 | McBride | 385/73 |
| 6,764,222 B1 | 7/2004 | Szilagyi et al. | |
| 6,789,950 B1 * | 9/2004 | Loder et al. | 385/53 |
| 7,261,472 B2 | 8/2007 | Suzuki et al. | |
| 7,284,912 B2 | 10/2007 | Suzuki et al. | |
| 7,340,146 B2 | 3/2008 | Lampert et al. | |
| 7,661,887 B2 * | 2/2010 | Nakagawa | 385/70 |
| 7,676,133 B2 * | 3/2010 | Lampert et al. | 385/134 |
| 7,686,518 B2 | 3/2010 | Case et al. | |
| 7,785,018 B2 * | 8/2010 | Jones et al. | 385/73 |
| 7,837,395 B2 | 11/2010 | Lin et al. | |
| 7,841,777 B2 | 11/2010 | Howard et al. | |

(Continued)

FOREIGN PATENT DOCUMENTS

| | | |
|---|---|---|
| CN | 1849730 A | 10/2006 |
| EP | 0893716 A1 | 1/1999 |
| EP | 1335455 A1 | 8/2003 |

*Primary Examiner* — Tina Wong
(74) *Attorney, Agent, or Firm* — Christopher S. Clancy; Christopher K. Marlow

(57) ABSTRACT

A shuttered adapter is described that includes a shuttered housing, a shutter sub-assembly frame contained within the housing, a pair of shutter doors hingedly secured to the shutter sub-assembly frame, and a door spring configured to push the shutter doors outward from the shutter sub-assembly frame and away from each other. In addition, a shuttered adapter is described that includes a housing and a spring-like shutter attached to the front of the center wall of the housing. The shutter has a pair a door flaps extending into the ports of the adapter at a rearward angle.

13 Claims, 15 Drawing Sheets

(56) References Cited

U.S. PATENT DOCUMENTS

| | | | |
|---|---|---|---|
| 8,186,890 B2 * | 5/2012 | Lu | 385/60 |
| 2007/0230874 A1 | 10/2007 | Lin | |
| 2008/0267566 A1 | 10/2008 | En Lin | |
| 2009/0028507 A1 | 1/2009 | Jones et al. | |
| 2011/0038581 A1 * | 2/2011 | Mudd et al. | 385/53 |

* cited by examiner

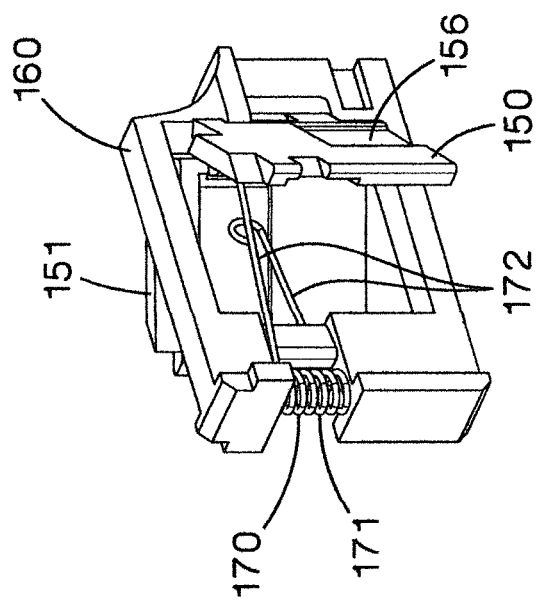
FIG.6
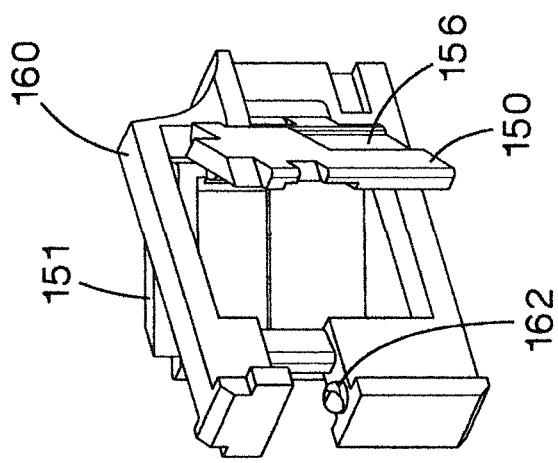
FIG.5
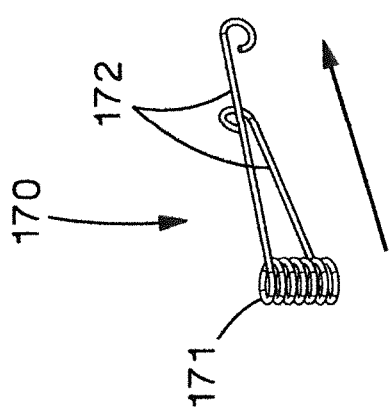

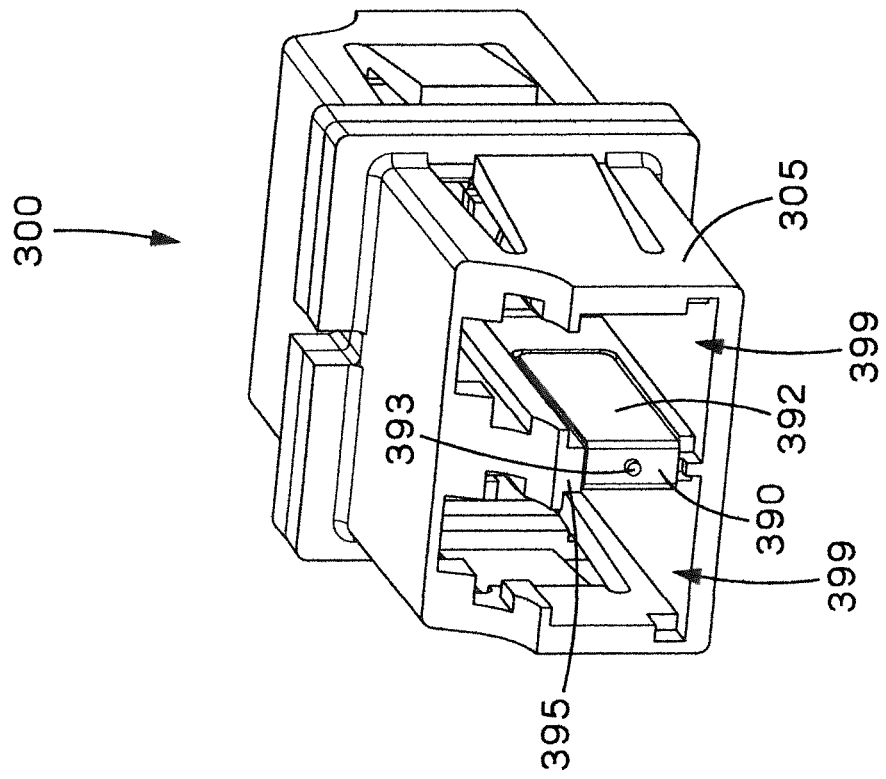
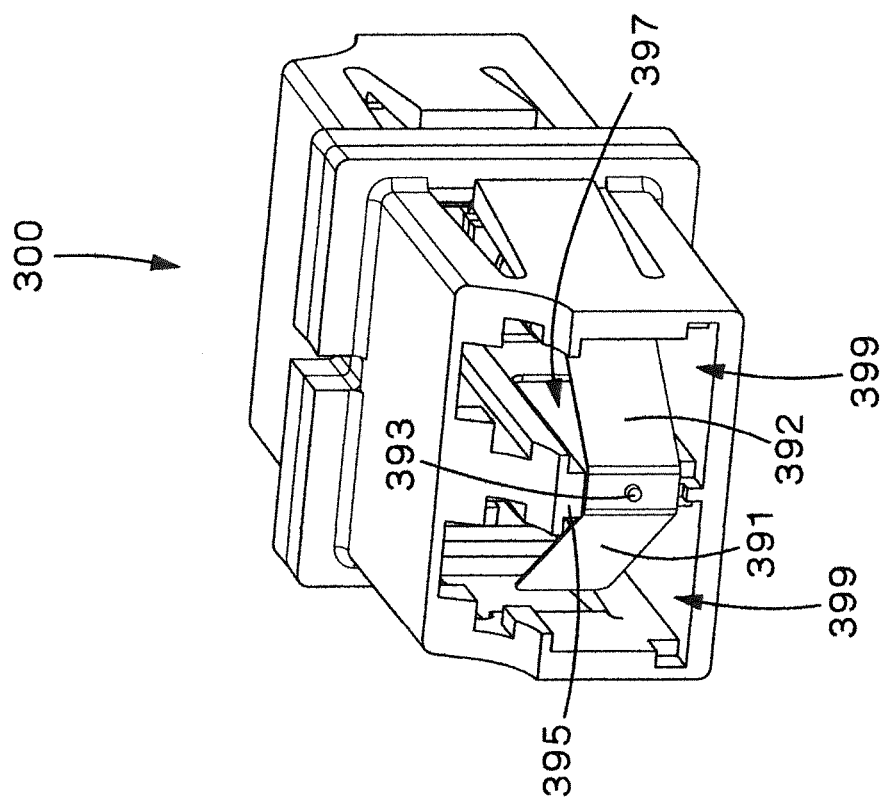

SHUTTERED LC ADAPTER

FIELD OF THE INVENTION

The present invention relates generally to fiber optic connections and more specifically to a shuttered LC fiber optic adapter.

BACKGROUND OF THE INVENTION

Optical adapters can provide connections between optical connectors. However, the cavities within the connectors are susceptible to dust and debris. In addition, light emitted from an uncovered connector can damage the eyes of a worker or technician who is installing or repairing a fiber optic system.

SUMMARY OF THE INVENTION

This application describes a shuttered LC adapter that includes a shuttered housing, a shutter sub-assembly frame contained within the housing, a pair of shutter doors hingedly secured to the shutter sub-assembly frame, and a door spring configured to push the shutter doors outward from the shutter sub-assembly frame and away from each other.

In some embodiments, the shutter sub-assembly frame is retained within the shuttered housing by sliding into a slot located in the rear of the shuttered housing.

In some embodiments, the shutter doors are hingedly secured to the shutter sub-assembly frame via c-clamps on the shutter doors engaging a post on the shutter sub-assembly frame or via a post and hole assembly on the shutter doors and retention bumps on the shutter door and shutter-sub-assembly frame.

In some embodiments, the door spring is a formed wire torsion spring and can include a spring body and a pair of spring arms. The door spring can be attached to the shutter sub-assembly frame via retention bumps.

In some embodiments, the door spring can be a flat formed spring.

In some embodiments, the shutter doors include ferrule relief pockets.

In some embodiments, the standard housing and the shuttered housing have retention bores that are aligned with each other. Alignment sleeves can be retained within the retention bores.

The present invention also describes a shuttered LC adapter that includes a housing and a spring-like shutter attached to the front of the center wall of the housing. The shutter has a pair of door flaps extending into the ports of the adapter at a rearward angle.

In some embodiments, the shutter can be composed of a spring-like metal such as spring steel.

BRIEF DESCRIPTION OF FIGURES

FIGS. 5 and 6 are perspective views showing the door spring of the shuttered LC adapter of FIG. 1 being attached to the shutter sub-assembly frame.

FIGS. 20 and 21 are perspective views showing a third embodiment of a shuttered LC adapter.

DETAILED DESCRIPTION OF THE PREFERRED EMBODIMENTS

Figure 1:
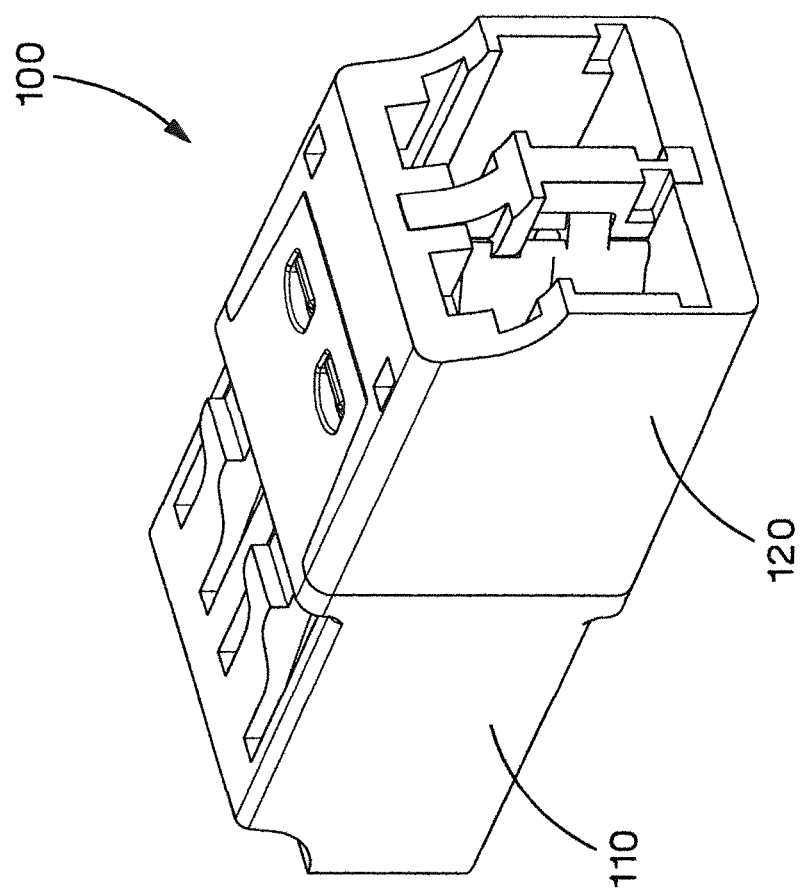
FIG. 1 is a perspective view of a first embodiment of a shuttered LC adapter.
Figure 2:
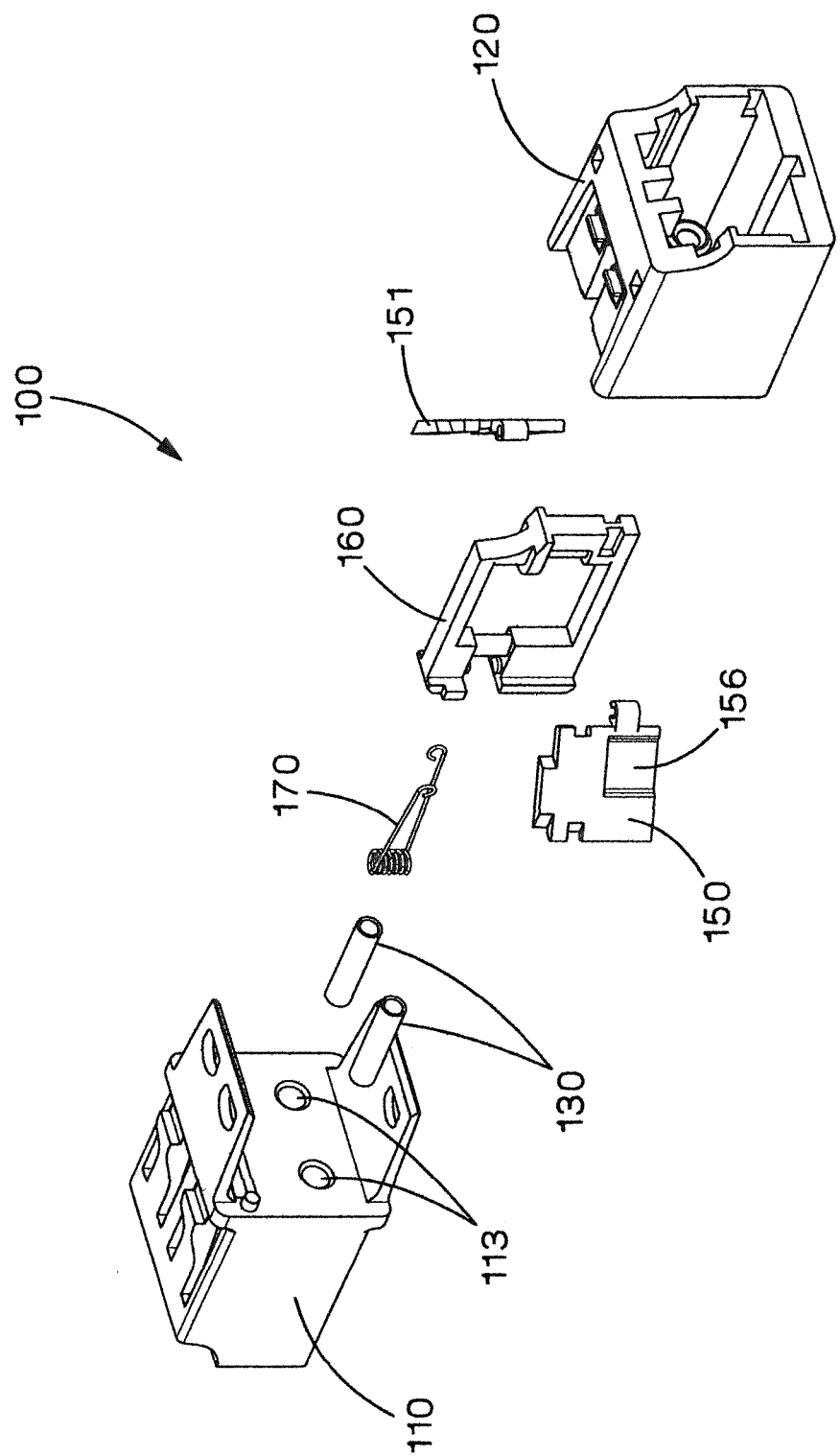
FIG. 2 is an exploded perspective view of the shuttered LC adapter of FIG. 1.

FIGS. 1-13 show a first embodiment of a shuttered LC adapter 100. As best shown in FIG. 2, the adapter includes a standard housing 110, a shuttered housing 120, alignment sleeves 130, shutter doors 150, 151, a shutter sub-assembly frame 160, and a door spring 170.

Figure 4:
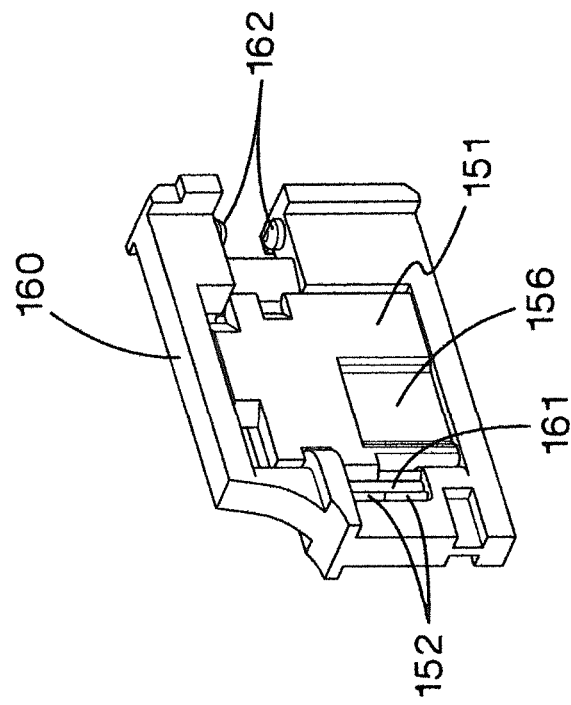
FIGS. 3 and 4 are perspective views showing the shutter doors of the shuttered LC adapter of FIG. 1 being attached to the shutter sub-assembly frame.
Figure 3:
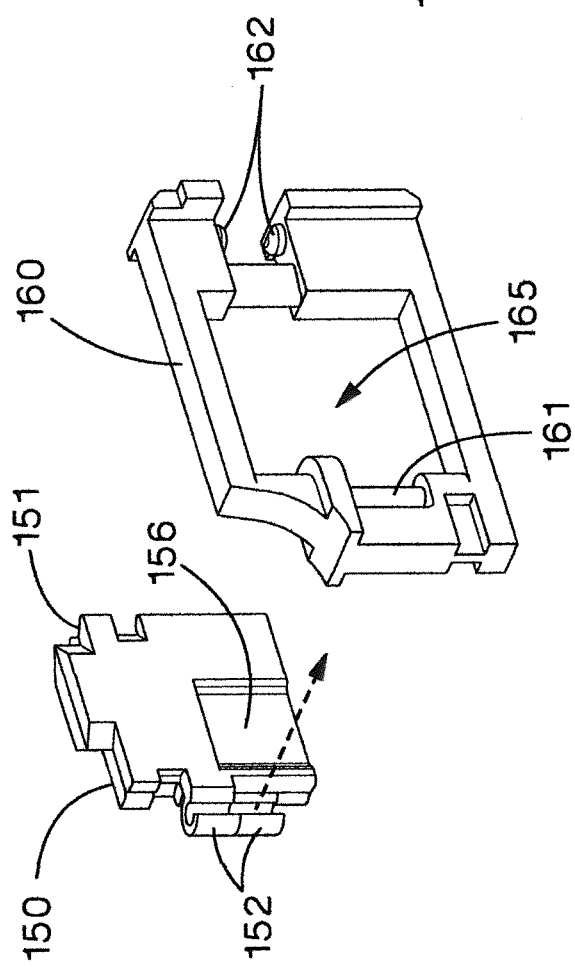

As best shown in FIGS. 3 and 4, the shutters doors 150, 151 can be nested together and attached to a frame post 161 on the shutter sub-assembly frame 160 via c-clamps 152 located on the shutter doors 150, 151. The c-clamps 152 can be arranged such that when the shutter doors 150, 151 are nested together the c-clamp 152 of the first door 150 sits directly above the c-clamp 152 of the second door 151.

As shown in FIGS. 5 and 6, the door spring 170 has a spring body 171 and a pair of spring arms 172. The spring body 170 attaches to the rear of the shutter sub-assembly frame 160 via a pair of retention bumps 162 located on the shutter sub-assembly frame 160 (see FIGS. 3 and 4 for the best views of the retention bumps 162). The spring arms 172 are configured to be inserted in between the shutter doors 150, 151 and provide a force that pushes the shutter doors 150, 151 outward from the shutter sub-assembly frame 160 and away from one another.

Figure 7:
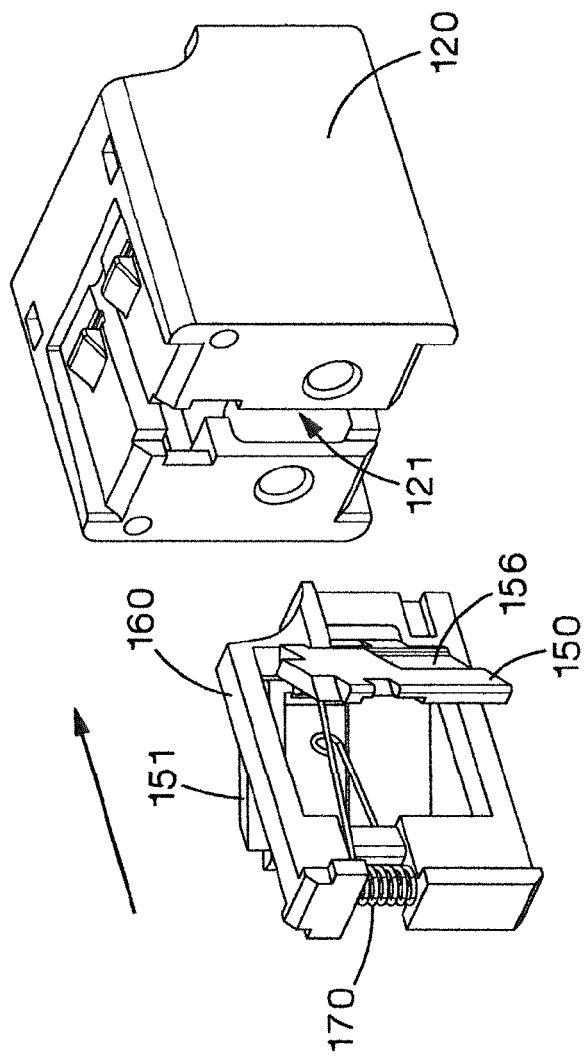
FIGS. 7 and 8 are perspective views showing the insertion of the door spring, shutter doors, and shutter sub-assembly frame into the shuttered housing.
Figure 8:
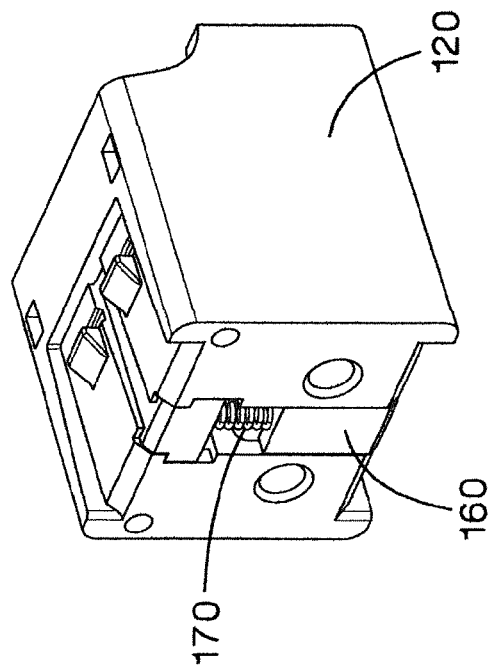

As shown in FIGS. 7 and 8, the shutter sub-assembly frame 160, the shutter doors 150, 151, and the door spring 170 are inserted into a slot 121 located in the rear of the shuttered housing 120.

Figure 9:
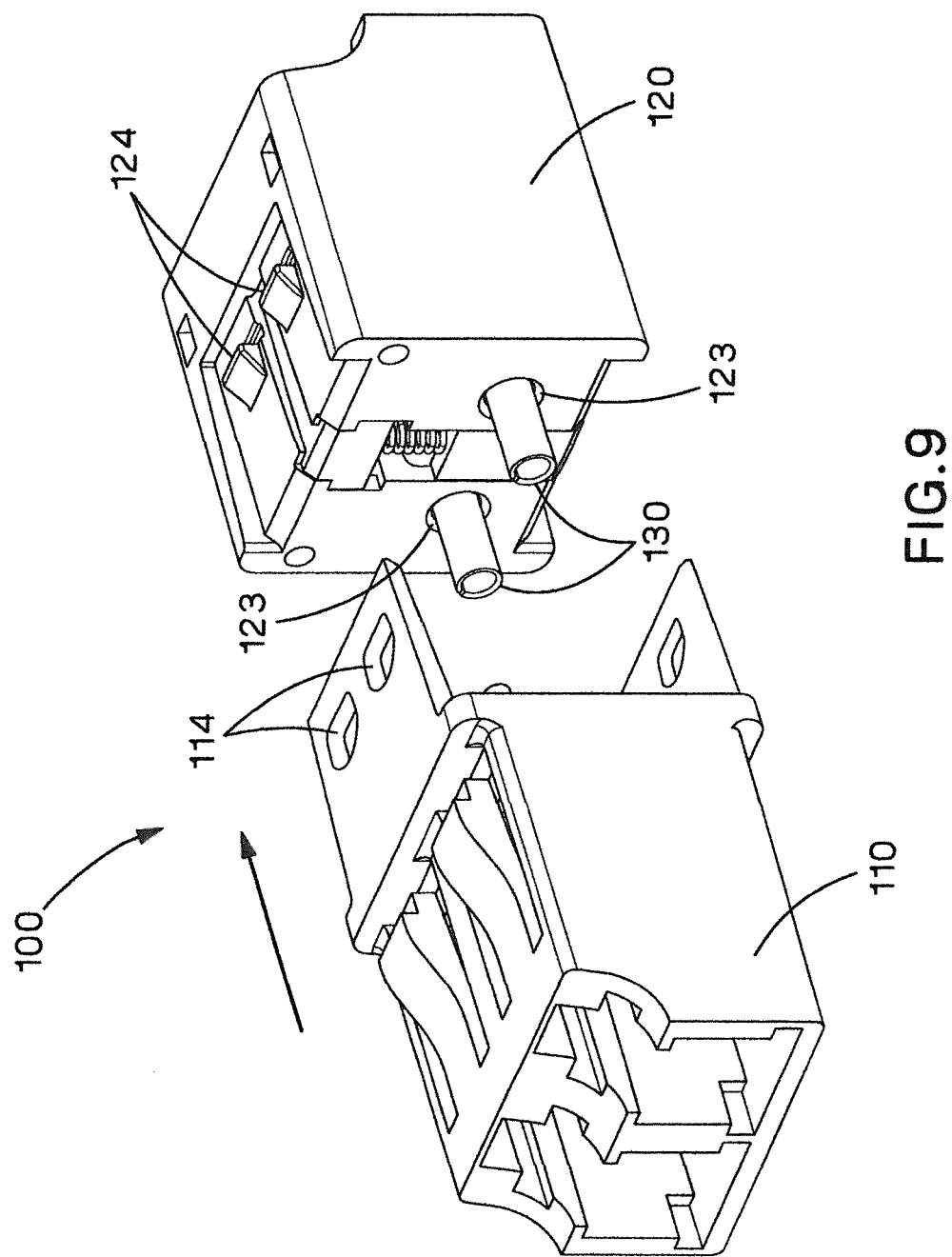
FIGS. 9 and 10 show the standard housing of the shuttered LC adapter of FIG. 1 being secured to the shuttered housing, including showing the alignment sleeves being placed within the retention bores.
Figure 10:
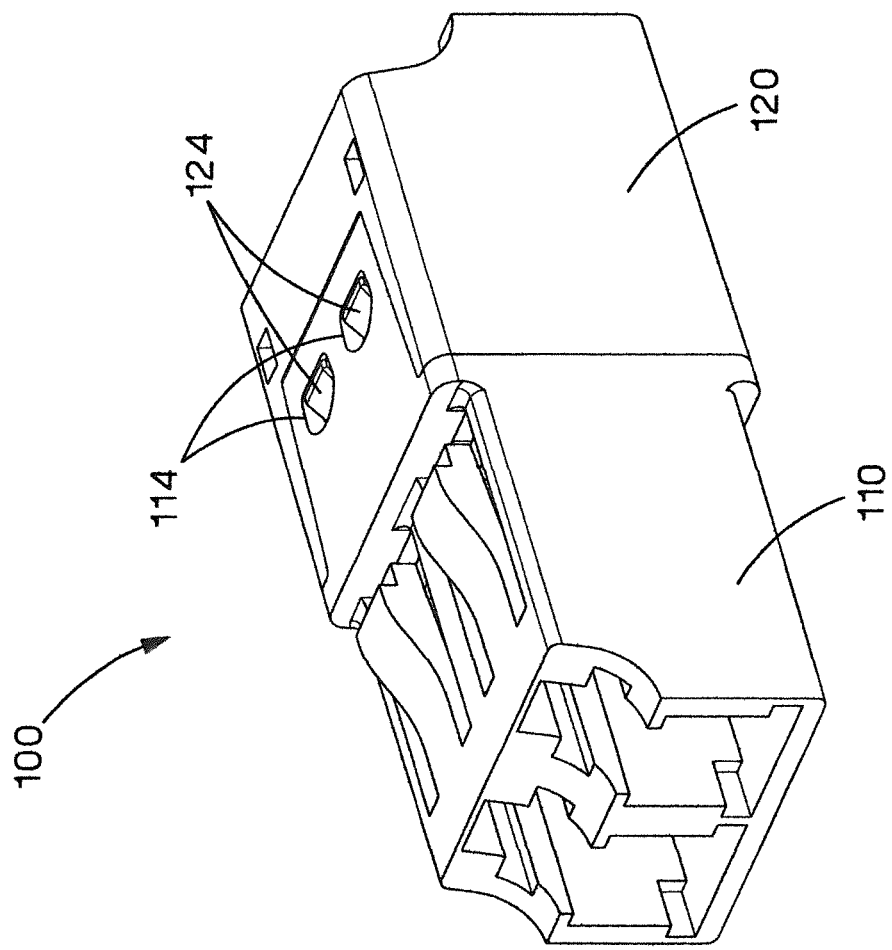

FIGS. 9 and 10 show the alignment sleeves 130 being inserted into the retention bores 123 of the shuttered housing 120 and then show the standard housing 110 being attached to the shuttered housing 120. The retention bores 123 of the shuttered housing 120 are configured to align with retention bores 113 of the standard housing 110 when the standard housing 110 is attached to the shuttered housing 120 (see FIG. 2 for the best view of the retention bores 113 of the standard housing 110). The alignment sleeves 130 are retained within the retention bores 113, 123 of both the shuttered housing 120 and the standard housing 110. In the embodiments of FIGS. 1-13, the standard housing 110 attaches to the shuttered housing 120 via complimentary snap features 114, 124, however, the present invention is not limited to these features as other means known in the art may be used to secure two housing parts together.

Figure 11:
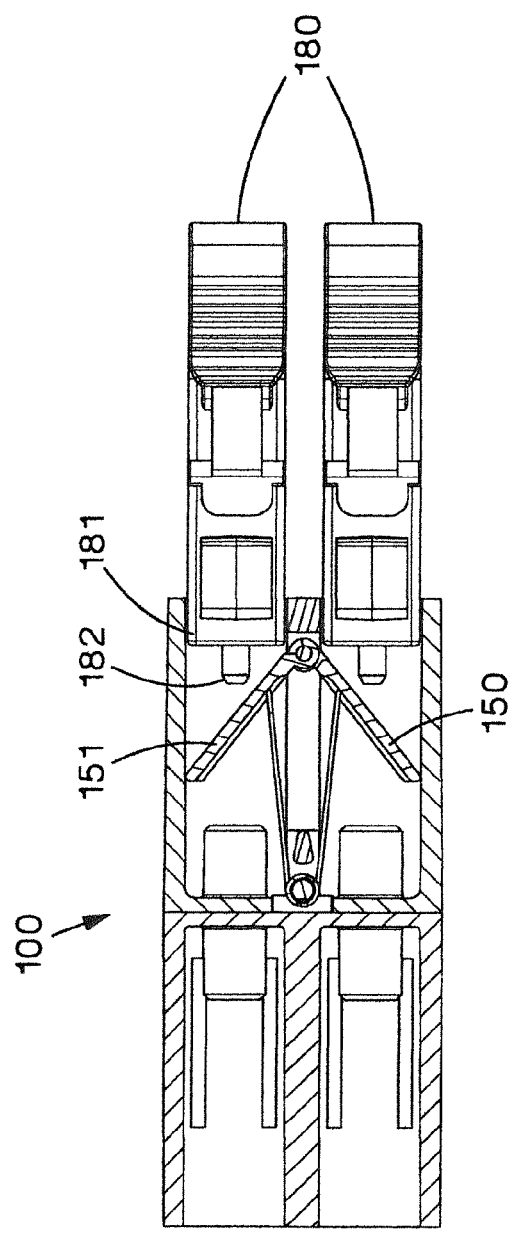
FIGS. 11-13 are top down cross-sectional views of the shuttered LC adapter of FIG. 1 showing the insertion of a duplex connector into the shuttered LC adapter.
Figure 12:
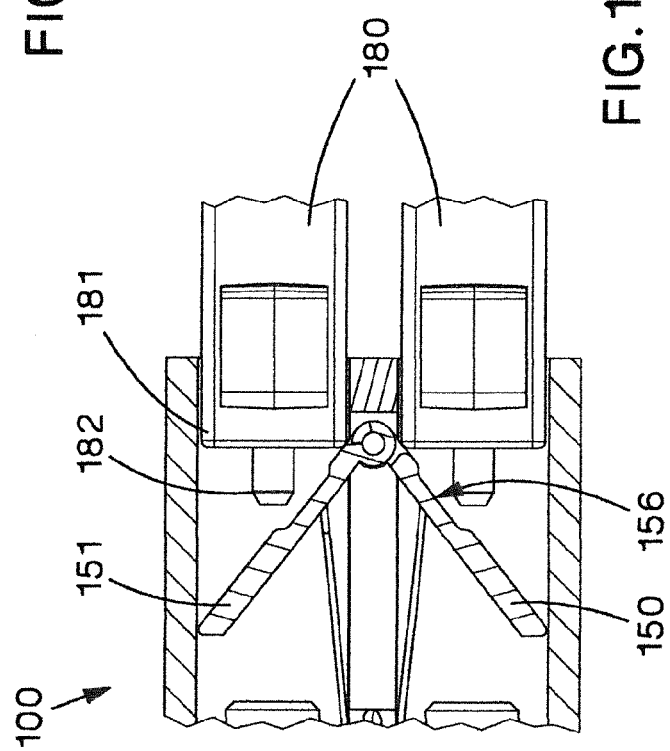
Figure 13:
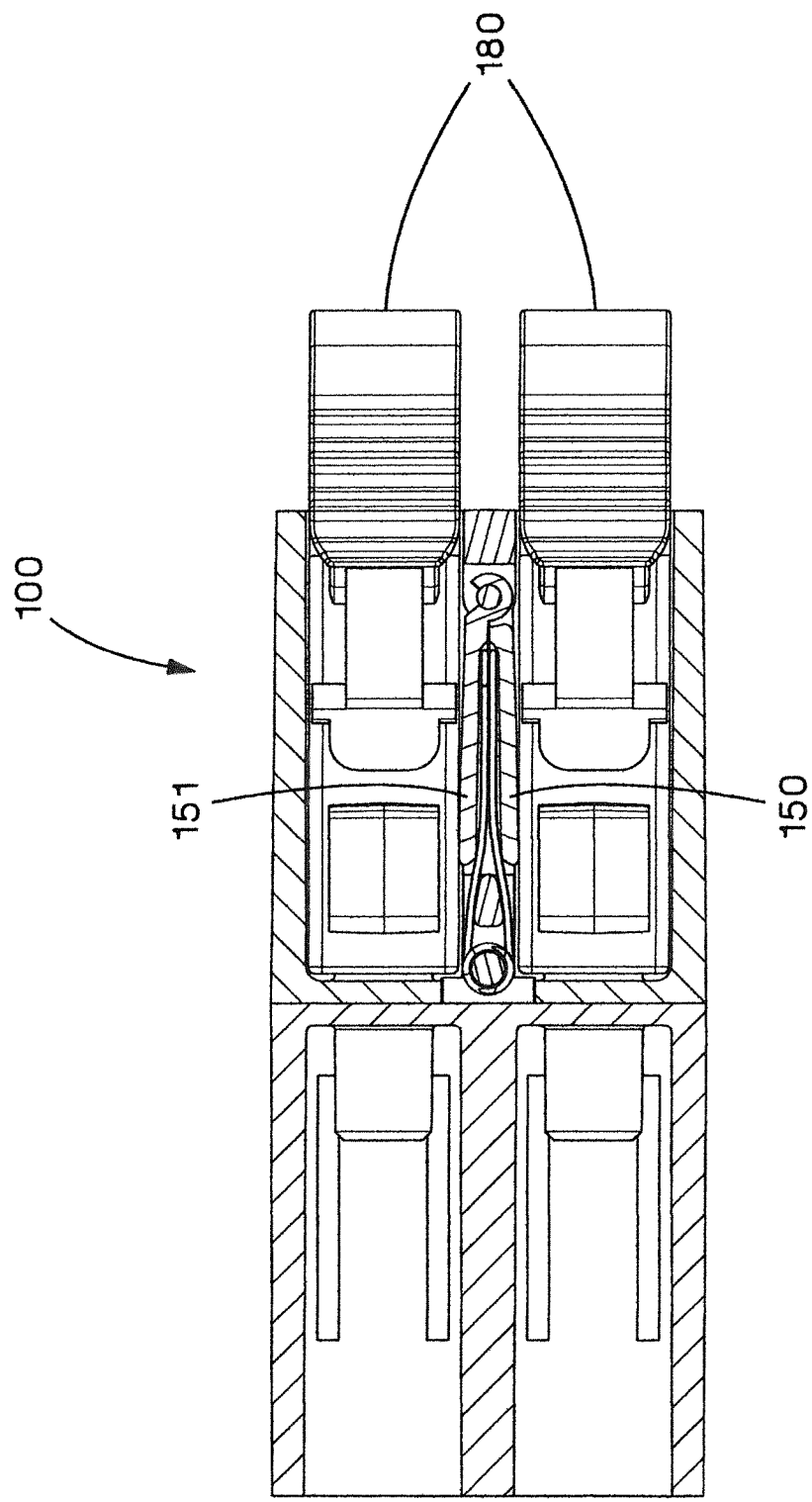
Figure 14:
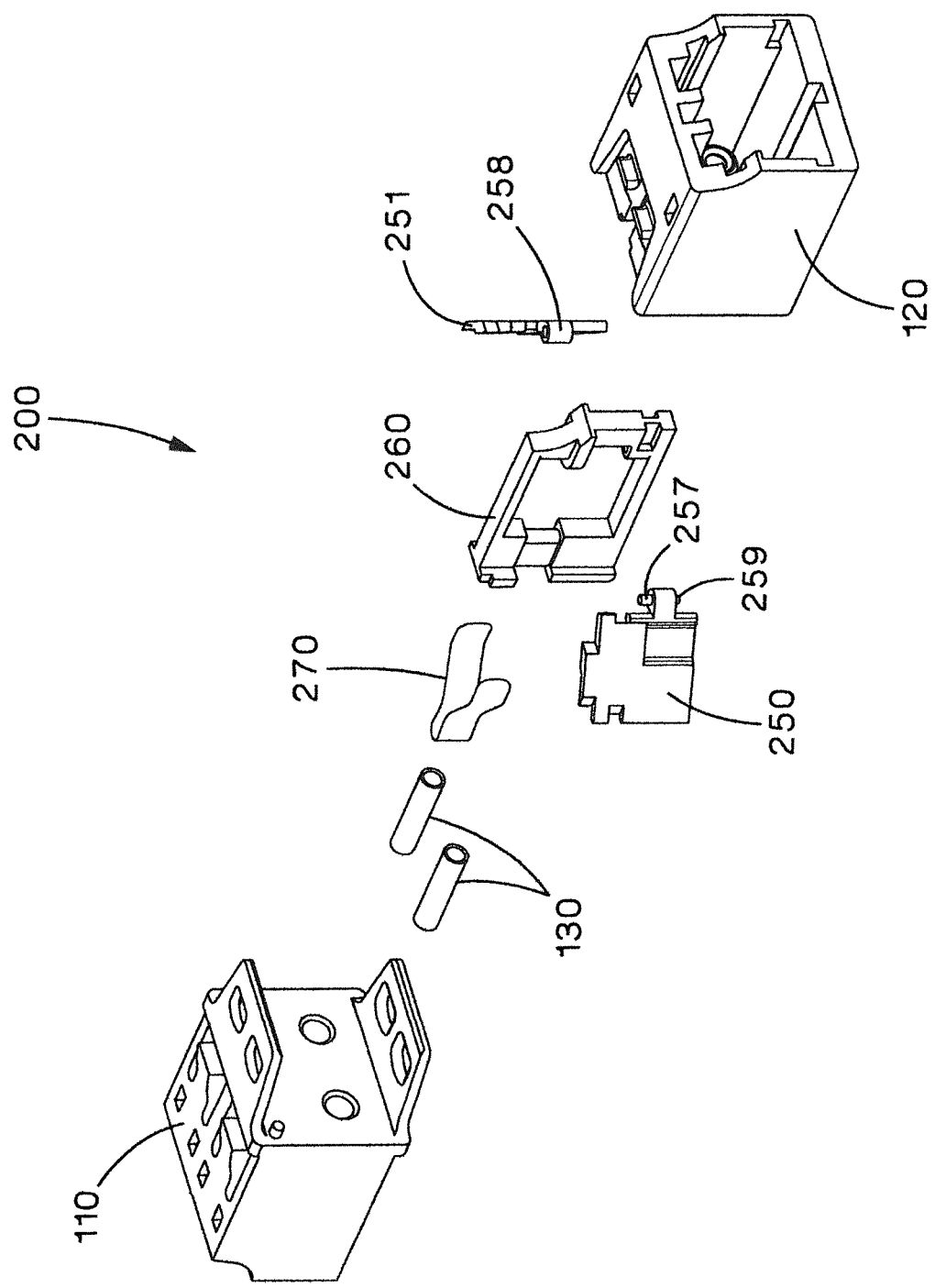
FIG. 14 is an exploded perspective view of a second embodiment of a shuttered LC adapter.
Figure 16:
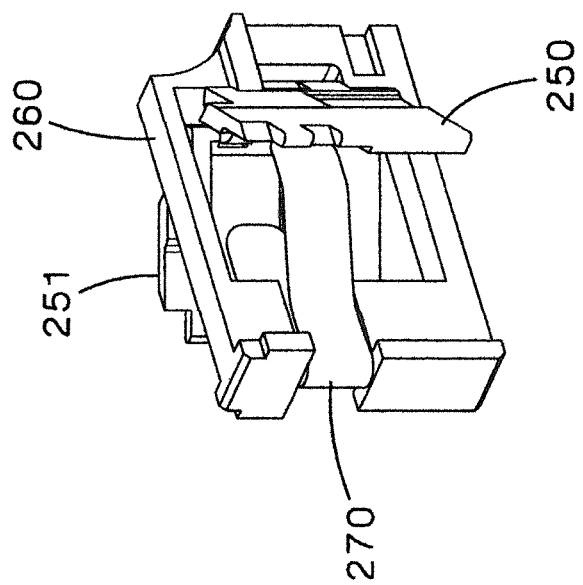
FIGS. 15 and 16 are perspective views showing the door spring of the shuttered LC adapter of FIG. 14 being attached to the shutter sub-assembly frame and inserted between the shutter doors.
Figure 15:
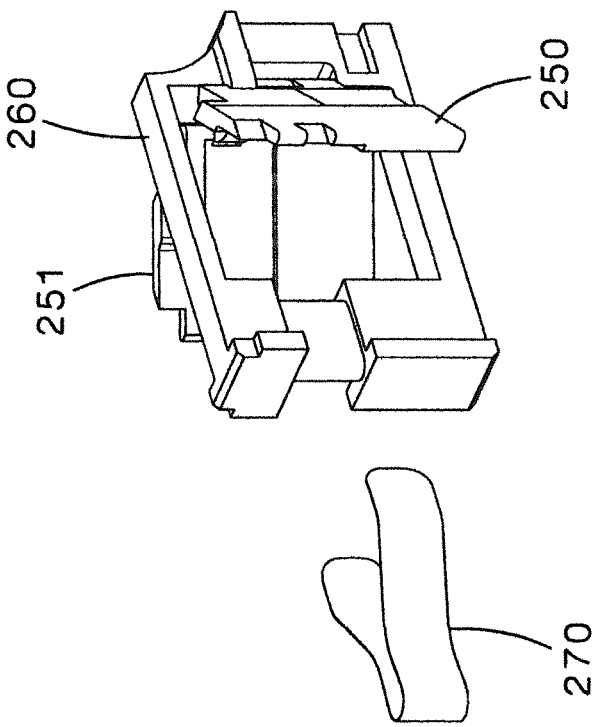
Figure 17:
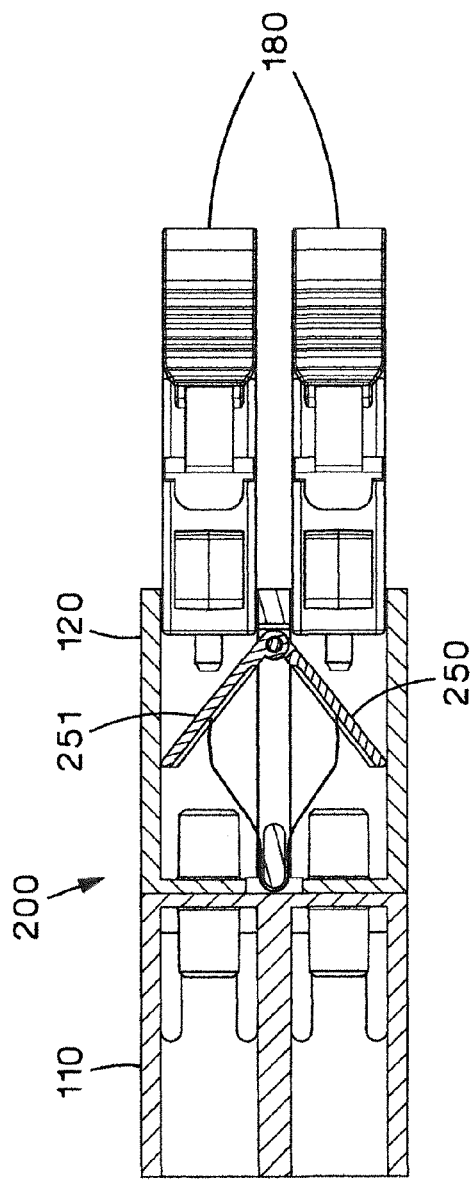
FIGS. 17-19 are top down cross-sectional views of the shuttered LC adapter of FIG. 14 showing the insertion of a duplex connector into the shuttered LC adapter.
Figure 18:
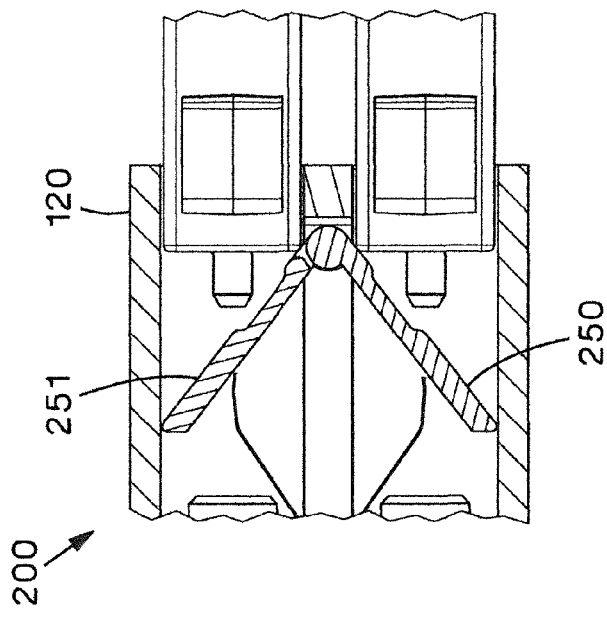
Figure 19:
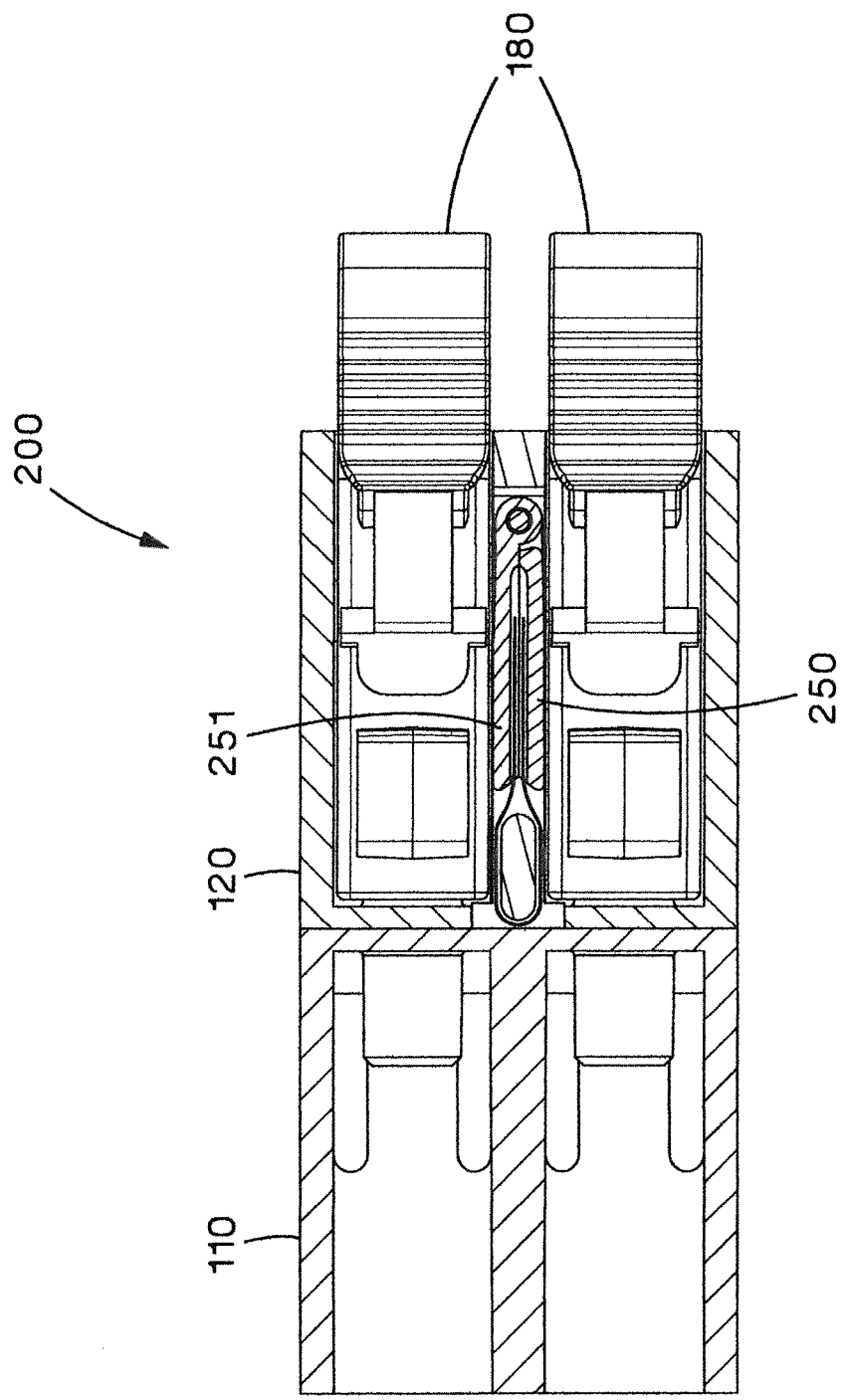

As shown in FIGS. 11-13, when a fiber optic connector 180 is inserted into the shuttered housing 120, the shutter doors 150, 151 are pushed inward and towards each other until they reside with an opening 165 (see FIG. 3 for the best view of the opening 165) in the shutter sub-assembly frame 160. The shutter doors 150, 151 are preferably configured to be at a rearward angle (even when a fiber optic plug has not been inserted into the shuttered housing) such as to allow the housing 181 of the LC connector 180 to make contact with the shutter doors 150, 151 and push them inward and towards each other before the ferrule 182 of the connector 180 can make contact with the shutter doors 150, 151 in order to prevent the shutter doors 150, 151 from damaging the ferrule 182 when the connector 180 is inserted into the shuttered housing 120 (this is best shown in FIG. 12). In one embodiment, ferrule relief pockets 156 can be cut into the front of the shutter doors 150, 151 in order to aid in preventing the ferrule 182 from making contact with the shutter doors 150, 151 (see also FIGS. 3 and 4 for views of the ferrule relief pockets 156).

FIGS. 14-19 show a second embodiment of a shuttered LC adapter 200. This embodiment is similar to the first embodiment, except it shows a different door spring 270 (specifically, a flat formed spring as opposed to the formed wire torsion spring of the first embodiment), and the shutter doors 250, 251 are attached to the shutter sub-assembly frame 260 by a post and hole assembly 257, 258 on the shutter doors and retention bumps 259 on one of the shutter doors 250 and on the shutter sub-assembly frame 260 (the retention bump on the shutter sub-assembly frame is not shown).

FIGS. 20-24 show a third embodiment of a shuttered LC adapter 300. This embodiment utilizes a shutter 390 formed from a thin piece of spring-like material such as a resilient metal like spring steel attached onto the front of the center wall 395 of an adapter housing 305. The adapter housing 305 has two LC port openings 399 with a center wall 395 separating them. The shutter 390 has first and second door flaps 391, 392 that extend into the housing at a rearward angle relative to the faces of the LC port openings 399. In one embodiment, the shutter 390 can be "staked" into position using an ultrasonic welder to melt and compress a feature 393 on the center wall 395 of the adapter housing 305.

Figure 22:
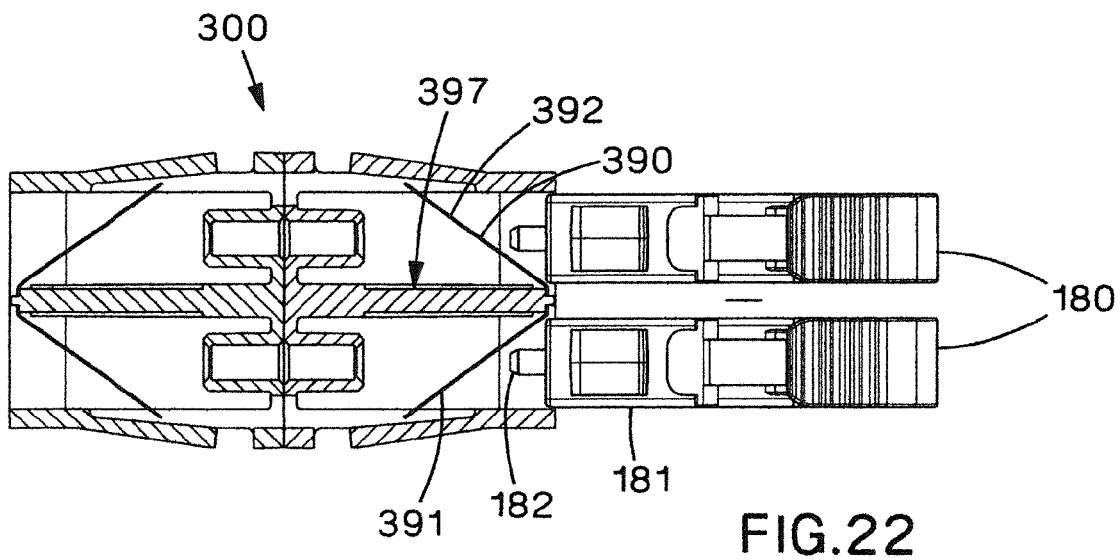
FIGS. 22-24 are top down cross-sectional views of the shuttered LC adapter of FIGS. 20 and 21 showing the insertion of a duplex connector into the shuttered LC adapter.
Figure 23:
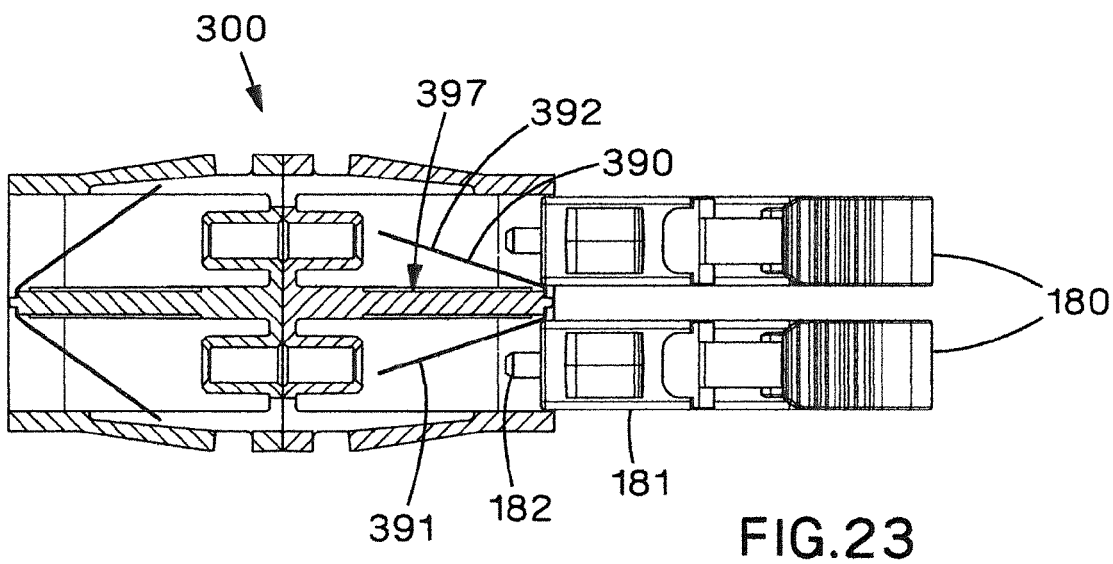
Figure 24:
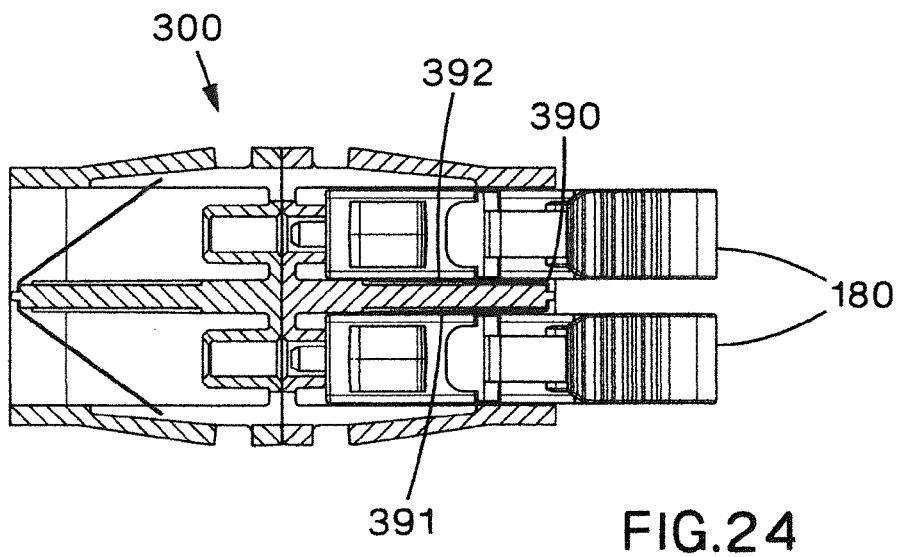

As shown in FIGS. 22-24, when a connector 180 is inserted into the adapter 300, the first and second door flaps 391, 392 deflect into a recess 397 within the center wall 395 of the adapter 300, allowing mechanical integrity to be maintained by having the connector 180 contact the center wall 395 of the adapter above and below the recessed door flap 391, 392. Alternatively, the shutter 390 could be used as a side wall when deflected inward to stabilize the connector. As in the other embodiments, the shutter door flaps 391, 392 are at a rearward angle such that the body 181 of the inserted connector 180 makes contact with the door flap 391, 392, causing it to fold in the center wall 395 before the ferrule 182 of the connector 180 can make contact with the door flap 391,392. One advantage of having a shutter 390 formed of a metal as compared to plastic is that metal can withstand higher amounts of laser power than plastic.

While all of the above embodiments show duplex adapters, the present invention is not limited to duplex adapters and could be used in adapters with one, three, or even more ports. In addition, in all three of the above mentioned embodiments, the shutters or shutter doors for each side of the duplex adapters work independently, which allows simplex usage of the duplex adapter while maintaining full light and dust protection. These embodiments also allow the connector latch geometry to be located on the housing which can reduce tolerance stack up. This embodiment also allows the adapter to be converted to a non-shuttered adapter by merely removing the shutter doors on the shutter sub-assembly frame or by replacing the shutter assembly frame with a component that has a solid wall or just does not have doors. This can reduce the cost of manufacturing by allowing the same housing to be used for both shuttered and non-shuttered adapters.

In some embodiments the shutter doors could be impregnated or coated with a substance that can convert invisible transmission light into visible light.

While particular embodiments and applications of the present invention have been illustrated and described, it is to be understood that the invention is not limited to the precise construction and compositions disclosed herein and that various modifications, changes, and variations may be apparent from the foregoing without departing from the spirit and scope of the invention as described.

What is claimed:

1. A shuttered duplex adapter comprising:
a shuttered housing;
a shutter sub-assembly frame contained within the housing, the shuttered sub-assembly frame located between adjacent ports of the duplex adapter;
first and second shutter doors hingedly secured to the shutter sub-assembly frame, the first and second shutter doors also being contained within the housing; and
a door spring configured to push the first and second shutter doors outward from the shutter sub-assembly frame and away from each other such that the first shutter door at least partially blocks a first port of the adjacent ports of the duplex adapter and the second shutter door at least partially blocks a second port of adjacent ports of the duplex adapter and wherein the shutter sub-assembly frame is retained within the shuttered housing by sliding into a slot located in a rear of the shuttered housing.

2. The shuttered adapter of claim 1 wherein the first and second shutter doors operate independently of each other.

3. The shuttered adapter of claim 1 wherein the first and second shutter doors are attached to the shutter sub-assembly frame via c-clamps on the first and second shutter doors engaging a post on the shutter sub-assembly frame.

4. The shuttered adapter of claim 1 wherein the first and second shutter doors are attached to the shutter sub-assembly frame via a post and hole assembly located on the first and second shutter doors and retention bumps located on the first shutter door and the shutter sub-assembly frame.

5. The shuttered adapter of claim 1 wherein the door spring is a formed wire torsion spring.

6. The shuttered adapter of claim 5 wherein the door spring has a spring body and a pair of spring arms, the spring arms being placed in between the first and second shutter doors and configured to apply an outward force.

7. The shuttered adapter of claim 6 wherein the spring body of the door spring is secured to the shutter sub-assembly frame via retention bumps.

8. The shuttered adapter of claim 1 wherein the door spring is a flat formed spring.

9. The shuttered adapter of claim 1 wherein the shutter doors further comprise ferrule relief pockets.

10. The shuttered adapter of claim 1 further comprising a standard housing secured to the shuttered housing.

11. The shuttered adapter of claim 10 wherein the standard housing is secured to the shuttered housing via snap-on features.

12. The shuttered adapter of claim 11 wherein the standard housing and the shuttered housing each comprise at least one retention bore, the at least one retention bore of the standard housing being aligned with the at least one retention bore of the shuttered housing.

13. The shuttered adapter of claim 12 further comprising at least one alignment sleeve, the at least one alignment sleeve being inserted through the at least one retention bore of the standard housing and the at least one retention bore of the shuttered housing.

* * * * *